(12) United States Patent
Huang

(10) Patent No.: US 8,562,173 B1
(45) Date of Patent: Oct. 22, 2013

(54) ILLUMINATION SYSTEM

(75) Inventor: Junejei Huang, Taoyuan-Hsien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 13/565,222

(22) Filed: Aug. 2, 2012

(30) Foreign Application Priority Data

May 21, 2012 (TW) .............................. 101117936 A

(51) Int. Cl.
*F21V 9/00* (2006.01)
*G03B 21/00* (2006.01)
*H01S 3/00* (2006.01)

(52) U.S. Cl.
USPC .............................. 362/231; 353/31; 359/333

(58) Field of Classification Search
USPC ........ 362/231, 800; 353/8, 20, 31, 33, 34, 37, 353/52, 122; 349/5, 7, 8, 9; 359/349, 334, 359/333, 563, 565, 566, 558, 579, 707; 372/42, 68, 101, 102, 103, 108
See application file for complete search history.

(56) References Cited

U.S. PATENT DOCUMENTS

| | | | |
|---|---|---|---|
| 7,347,561 B2 | 3/2008 | Pentico et al. | |
| 7,775,668 B2 | 8/2010 | Yao et al. | |
| 7,926,951 B2 | 4/2011 | Bietry et al. | |
| 7,990,607 B2 | 8/2011 | Chou | |
| 2006/0023167 A1 | 2/2006 | Chiang et al. | |

FOREIGN PATENT DOCUMENTS

| | | |
|---|---|---|
| CN | 1367396 A | 9/2002 |
| CN | 101131531 A | 2/2008 |
| CN | 101770078 A | 7/2010 |
| TW | 201131278 A1 | 9/2011 |

*Primary Examiner* — Joseph L Williams
(74) *Attorney, Agent, or Firm* — Cantor Colburn LLP

(57) ABSTRACT

An illumination system is provided, which includes a first solid-state light source, a second solid-state light source, a third solid-state light source, a light combining element, a light homogenizing element, a first plate and a first band-stop filter. The first solid-state light source to the third solid-state light source respectively provide a first-wavelength light beam to a third-wavelength light beam. The first plate has a first surface opposite to an outputting surface of the light combining element and a first phosphor, while the first phosphor is excited by the third-wavelength light beam to produce a fourth-wavelength light beam. The first band-stop filter allows the first-wavelength light beam to the third-wavelength light beam to pass therethrough and reflects the fourth-wavelength light beam. With these arrangements, the illumination system can strengthen the light of a specific color and the volume of the illumination system can be reduced.

12 Claims, 9 Drawing Sheets

ILLUMINATION SYSTEM

CROSS-REFERENCES TO RELATED APPLICATIONS

This application claims priority to Taiwan Patent Application No. 101117936 filed on May 21, 2012, which is hereby incorporated herein by reference in its entirety.

BACKGROUND OF THE INVENTION

1. Field of the Invention

The present invention relates to an illumination system, and more particularly, to an illumination system for a projection apparatus.

2. Descriptions of the Related Art

Due to advantages such as a short startup time and a long service life, light emitting diodes (LEDs) have been widely used as light sources of common projection apparatuses in place of conventional high-pressure mercury lamps (HPLs).

Generally, a projection system uses LEDs to provide light beams of the three primary colors (i.e., red, green and blue) that are projected in different directions, and then, the light beams of the three primary colors are combined by a light combining element into a full-color (i.e., white color) light beam for projection to a light valve (e.g., a DMD, an LCD or an LCoS) of a projection apparatus. However, as compared to the intensities of the red light beam provided by the red LED or the blue light beam provided by the blue LED, the intensity of the green light beam provided by the green LED is weaker. As a consequence, the brightness of the green color of the image projected by the projection apparatus is relatively low, which makes the image look unnatural.

Therefore, an illumination system capable of enhancing the intensity of the green light has been developed in the art. FIG. 1 illustrates an illumination system 1 that comprises a red LED 11, two blue LEDs 13, 15, and an ultraviolet (UV) LED 17. The red LED 11 and the blue LED 13 are adapted to provide a red light beam and a blue light beam respectively for the illumination system 1. The blue LED 15 and the UV LED 17 are adapted to excite a green phosphor 12 via two light splitters 19a, 19b respectively to provide a green light beam of an adequate intensity for the illumination system 1.

Because the illumination system 1 needs to use more than one light splitters and each of the LEDs must be provided with a lens, the size of the projection apparatus is increased. If the volume of the projection apparatus needs to be reduced, the structure of the illumination system must be reduced, which would cause a decrease in the brightness thereof. Furthermore, the green light beam provided by the illumination system 1 does not have an adequate intensity that matches the intensities of the red light beam and the blue light beam.

Accordingly, it is important to provide an illumination system that can enhance the intensity of a light beam of a specific color (e.g., the green light) and that has a reduced volume.

SUMMARY OF THE INVENTION

An objective of the present invention is to reduce the space occupied by an illumination system. By reducing the number of solid-state light sources, the size of conventional illumination systems can be avoided (i.e. the problem that conventional illumination systems occupy a large space can be avoided). The illumination system of the present invention can reduce the space occupied without compromising the intensity of a light beam of a specific color (e.g., a green light beam).

To achieve the aforesaid objective, the present invention provides an illumination system, which comprises a first solid-state light source, a second solid-state light source, a third solid-state light source, a light combining element, a light homogenizing element, a first plate and a first band-stop filter. The first solid-state light source is adapted to provide a first-wavelength light beam; the second solid-state light source is adapted to provide a second-wavelength light beam; and the third solid-state light source is adapted to provide a third-wavelength light beam. The light combining element has three inputting surfaces: an outputting surface, a second-wavelength-light-beam reflecting surface and a gap layer. The second-wavelength-light-beam reflecting surface and the gap layer intersect with each other. The second-wavelength-light-beam reflecting surface and the gap layer are located among the three inputting surfaces and the outputting surface. The second-wavelength-light-beam reflecting surface is used to allow the first-wavelength light beam and the third-wavelength light beam to pass therethrough and reflect the second-wavelength light beam. The first, the second and the third solid-state light sources are disposed in front of the three inputting surfaces respectively. The light homogenizing element is disposed apart from the outputting surface. The first plate is disposed apart from the outputting surface, and has a first phosphor and a first surface opposite the outputting surface. The first phosphor is disposed on the first surface to be excited by the third-wavelength light beam to produce a fourth-wavelength light beam. The first band-stop filter is disposed between the outputting surface and the light homogenizing element, and is used to allow the first-wavelength light beam to the third-wavelength light beam to pass therethrough and reflect the fourth-wavelength light beam.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
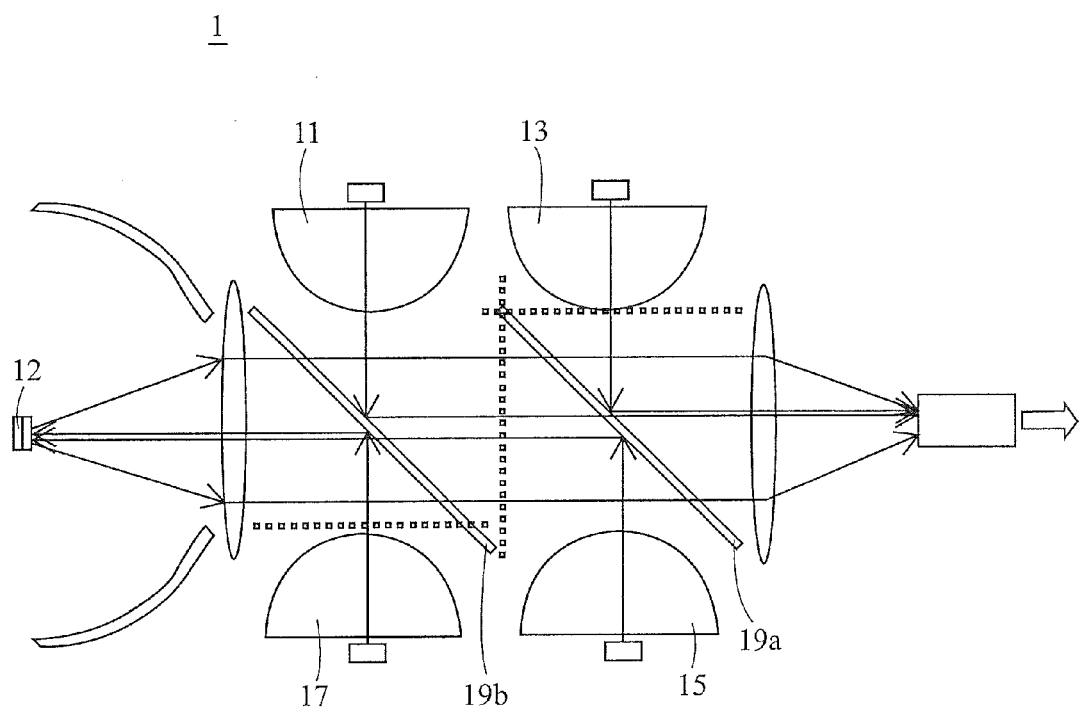
FIG. 1 is a schematic view of a conventional illumination system.
Figure 2:
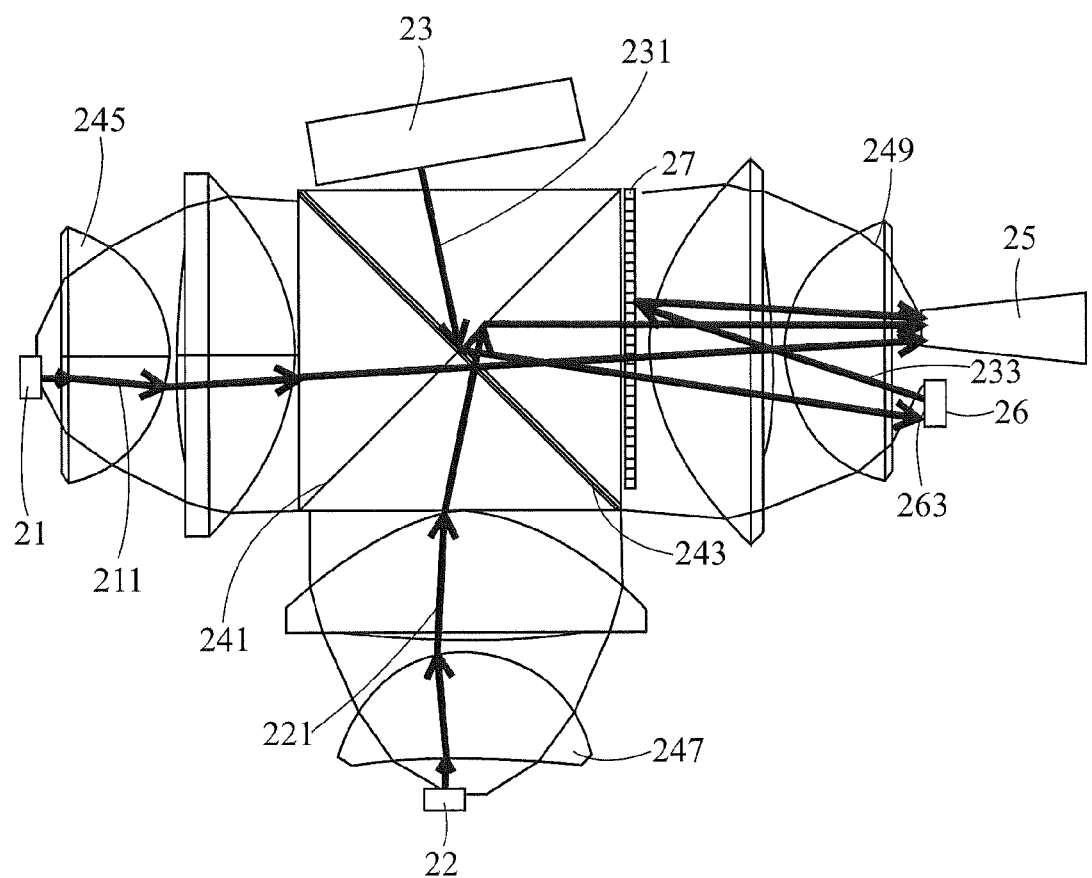
FIG. 2 is a schematic view of an illumination system according to the first embodiment of the present invention.

FIG. 2 illustrates a schematic view of an illumination system according to the first embodiment of the present invention. The illumination system 2 has a first solid-state light source 21, a second solid-state light source 22, a third solid-state light source 23, a light combining element 24, a light homogenizing element 25, a first plate 26 and a first band-stop filter 27.

The first solid-state light source 21 is adapted to (i.e. used to) provide a first-wavelength light beam 211; the second solid-state light source 22 is adapted to provide a second-wavelength light beam 221; and the third solid-state light source 23 is adapted to provide a third-wavelength light beam 231. The first-wavelength light beam 211, the second-wavelength light beam 221 and the third-wavelength light beam 231 have a specific waveband (or wavelength) respectively; and any two of the wavebands of the first-wavelength light beam 211, the second-wavelength light beam 221 and the third-wavelength light beam 231 may be completely overlapping, partially overlapping or not overlapping at all.

In this embodiment, the first solid-state light source 21 and the second solid-state light source 22 may be a blue LED and a red LED respectively, while the third solid-state light source 23 may be a blue laser light source. Furthermore, the first-wavelength light beam 211 and the second-wavelength light beam 221 may be a blue light beam and a red light beam respectively, while the third-wavelength light beam 231 may be a blue laser light beam.

Figure 3:
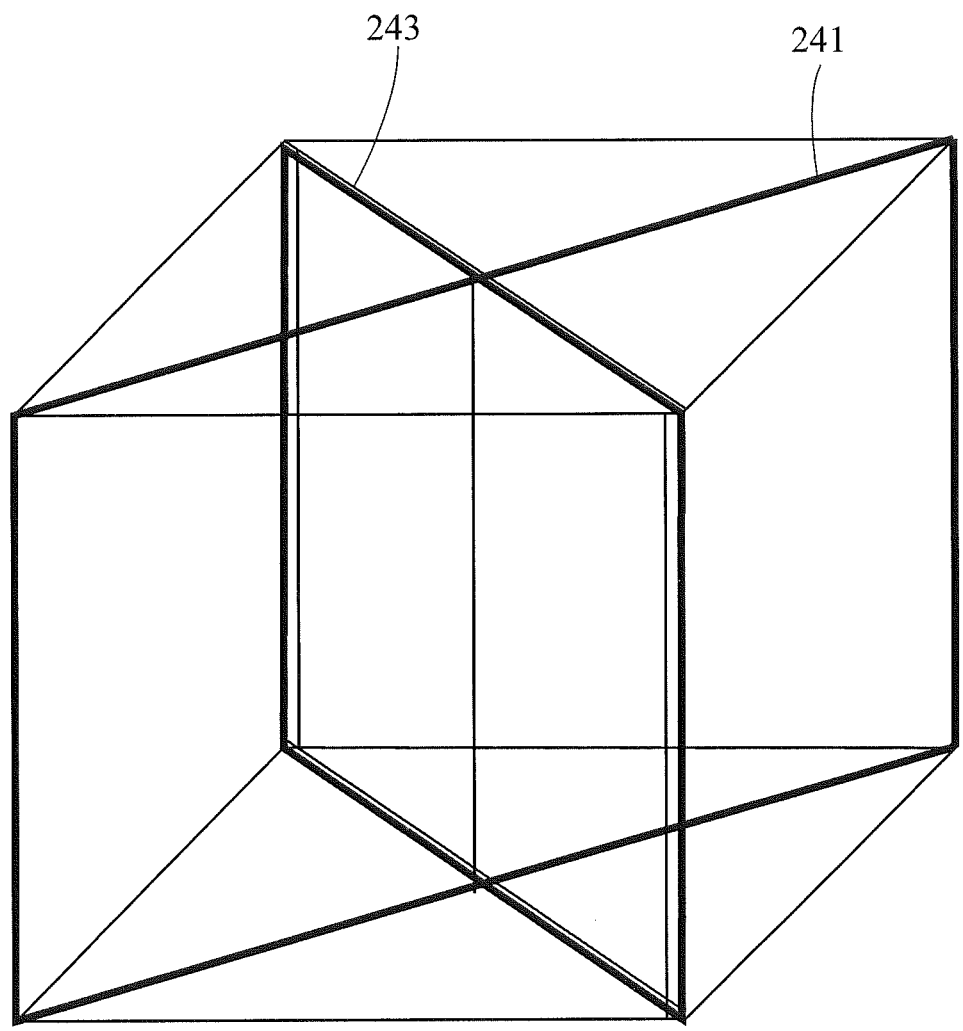
FIG. 3 is a schematic view illustrating a light combining element of the illumination system according to the first embodiment of the present invention.

FIG. 3 illustrates a schematic view of the light combining element of the illumination system according to the first embodiment of the present invention. The light combining element 24 has three inputting surfaces, an outputting surface, a second-wavelength-light-beam reflecting surface 241 and a gap layer 243. The second-wavelength-light-beam reflecting surface 241 and the gap layer 243 intersect with each other, and are located between the three inputting surfaces and the outputting surface to form an X-shaped structure to divide the light combining element 24 into four light-path regions. In this embodiment, the light combining element 24 is an X-cube; however, in other embodiments, the light combining element 24 may also be an X-plate.

With reference back to FIG. 2, the three inputting surfaces and the outputting surface correspond to the four light-path regions of the light combining element 24 respectively, and the first solid-state light source 21, the second solid-state light source 22 and the third solid-state light source 23 are disposed in front of the three inputting surfaces respectively. The light combining element 24 is adapted to provide (or define) a light travelling route for each of the first-wavelength light beam 211, the second-wavelength light beam 221 and the third-wavelength light beam 231.

The second-wavelength-light-beam reflecting surface 241, which may be an optical coating, has the property of reflecting the second-wavelength light beam 221 but can allow the first-wavelength light beam 211 and the third-wavelength light beam 231 to pass therethrough.

The gap layer 243 has a specific refractive index. Specifically, when a light beam is emitted to the gap layer 243 at an incident angle larger than or equal to a critical angle of total internal reflection, the light beam will be totally reflected by the gap layer 243; and when a light beam is emitted to the gap layer 243 at an incident angle smaller than the critical angle of total internal reflection, the light beam will be partially reflected or pass through the gap layer 243. In this embodiment, the gap layer 243 is an air layer. The first solid-state light source 21 and the second solid-state light source 22 are disposed in such a way that the incident angles of the first-wavelength light beam 211 and the second-wavelength light beam 221 are smaller than the angle of total reflection, so the first-wavelength light beam 211 and the second-wavelength light beam 221 can pass through the gap layer 243. The third solid-state light source 23 is disposed in such a way that the incident angle of the third-wavelength light beam 231 is larger than the angle of total reflection, so the third-wavelength light beam 231 will be reflected by the gap layer 243.

Still, with reference to FIG. 2, the light homogenizing element 25 is disposed apart from the outputting surface to homogenize the light beams. In the first embodiment, the light homogenizing element 25 is an integration rod; however, in other embodiments, people skilled in the art can also readily devise other forms of the light homogenizing element such as a lens array, a fly lens or a light tunnel.

Figure 4:
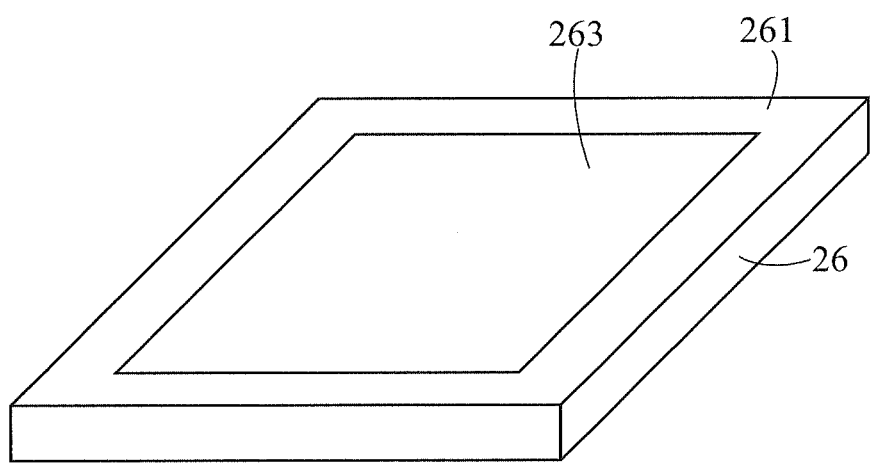
FIG. 4 is a schematic view illustrating the first plate of the illumination system according to the first embodiment of the present invention.

The first plate 26 is also disposed apart from the outputting surface. With reference to FIG. 4 in combination with FIG. 2, FIG. 4 is a schematic view of the first plate 26 of the first embodiment. The first plate 26 has a first phosphor 263 and a first surface 261 that is opposite to the outputting surface of the light combining element 24. The first phosphor 263 is disposed on the first surface 261. Thereby, after being reflected by the gap layer 243, the third-wavelength light beam 231 provided by the third solid-state light source 23 can excite the first phosphor 263 disposed on the first surface 261 of the first plate 26 to generate a fourth-wavelength light beam 233. The first surface 261 may be a mirror surface adapted to reflect the fourth-wavelength light beam 233. In this embodiment, the first phosphor 263 may be a green phosphor.

Still, with reference to FIG. 2, the first band-stop filter 27 is disposed between the outputting surface of the light combining element 24 and the light homogenizing element 25, and is used to allow the first-wavelength light beam 211 to the third-wavelength light beam 231 to pass therethrough and reflect the fourth-wavelength light beam 233. The first band-stop filter 27 may also be a coating containing a filtering component, and can be directly coated and disposed on the outputting surface to achieve the filtering effect.

A first lens set 245, a second lens set 247 and a third lens set 249 may be further provided for two inputting surfaces and the outputting surface of the light combining element 24 respectively. The first lens set 245 is disposed between the first solid-state light source 21 and the light combining element 24 to control a light path of the first-wavelength light beam 211. The second lens set 247 is disposed between the second solid-state light source 22 and the light combining element 24 to control a light path of the second-wavelength light beam 221. The third lens set 249 is disposed between the light homogenizing element 25 and the first band-stop filter 27 to control the light paths of the first-wavelength light beam 211 to the fourth-wavelength light beam 233.

In detail, the first-wavelength light beam 211 can be refracted by the first lens set 245 and then propagate into the light combining element 24 at a specific angle. The second-wavelength light beam 221 can be refracted by the second lens set 247 and then propagate into the light combining element 24 at a specific angle. After exiting from the light combining element 24, the first-wavelength light beam 211 and the second-wavelength light beam 221 can be refracted by the third lens set 249 and then propagate into the light homogenizing element 25 at a specific angle. After exiting from the light combining element 24, the third-wavelength light beam 231 can be refracted by the third lens set 249 and then propagates to the first plate 26 at a specific angle. Furthermore, the fourth-wavelength light beam 233 can also be refracted by the third lens set 249 and then propagates to the first band-stop filter 27 and the light homogenizing element 25 at a specific angle.

Figure 5:
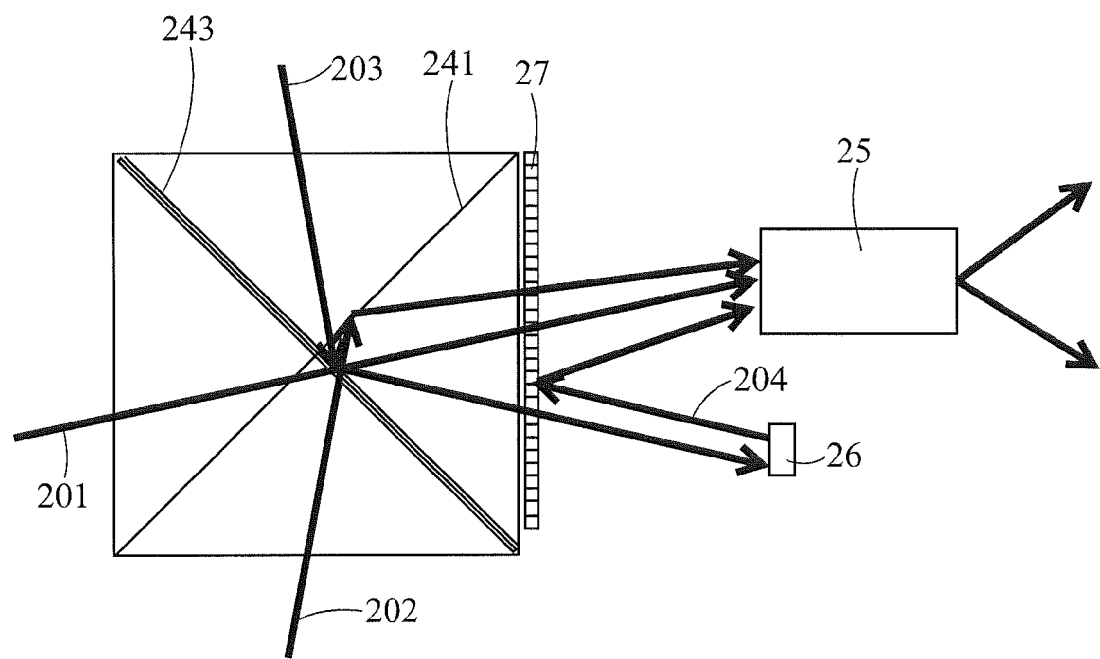
FIG. 5 is a schematic view illustrating light paths of the illumination system according to the first embodiment of the present invention.

With reference to FIGS. 2 and 5, the light paths of the light beams will be detailed. FIG. 5 is a schematic view illustrating light paths of the illumination system according to the first embodiment of the present invention. The first-wavelength light beam 211 (the blue light beam) provided by the first solid-state light source 21 propagates through the light combining element 24 into the light homogenizing element 25 along a first light path 201. The second-wavelength light beam 221 (the red light beam) provided by the second solid-state light source 22 is reflected by the second-wavelength-light-beam reflecting surface 241 to propagate into the light homogenizing element 25 along a second light path 202. The third-wavelength light beam 231 (the blue laser light beam) provided by the third solid-state light source 23 is reflected by the gap layer 243 out of the light combining element 24 along a third light path 203.

When being projected to the first phosphor 263 on the first plate 26, the third-wavelength light beam 231 can be converted by the first phosphor 263 into the fourth-wavelength light beam 233. Because the first phosphor 263 is a green phosphor, the fourth-wavelength light beam 233 generated through the excitation of the first phosphor 263 by the third-wavelength light beam 231 is a green light beam. The fourth-wavelength light beam 233 is reflected to the first band-stop filter 27 and then reflected by the first band-stop filter 27 into the light homogenizing element 25 along a fourth light path 204.

As can be known from the above descriptions, the light beams entering into the light homogenizing element 25 include the first-wavelength light beam 211 (the blue light beam), the second-wavelength light beam 221 (the red light beam) and the fourth-wavelength light beam 233 (the green light beam). Both the first-wavelength light beam 211 and the second-wavelength light beam 221 are provided by LEDs and thus, have adequate intensities. Because the fourth-wavelength light beam 233 is generated through the excitation of the first phosphor 263, the intensity thereof is also adequate. In other words, the light beams of various colors outputted from the light homogenizing element 25 all have an adequate intensity, so an image projected by the projection apparatus finally will not suffer from an inadequate intensity of a specific color (e.g., the green color).

Thus, the illumination system according to the first embodiment of the present invention has been described above. Next, an illumination system according to another embodiment of the present invention will be described.

Figure 6:
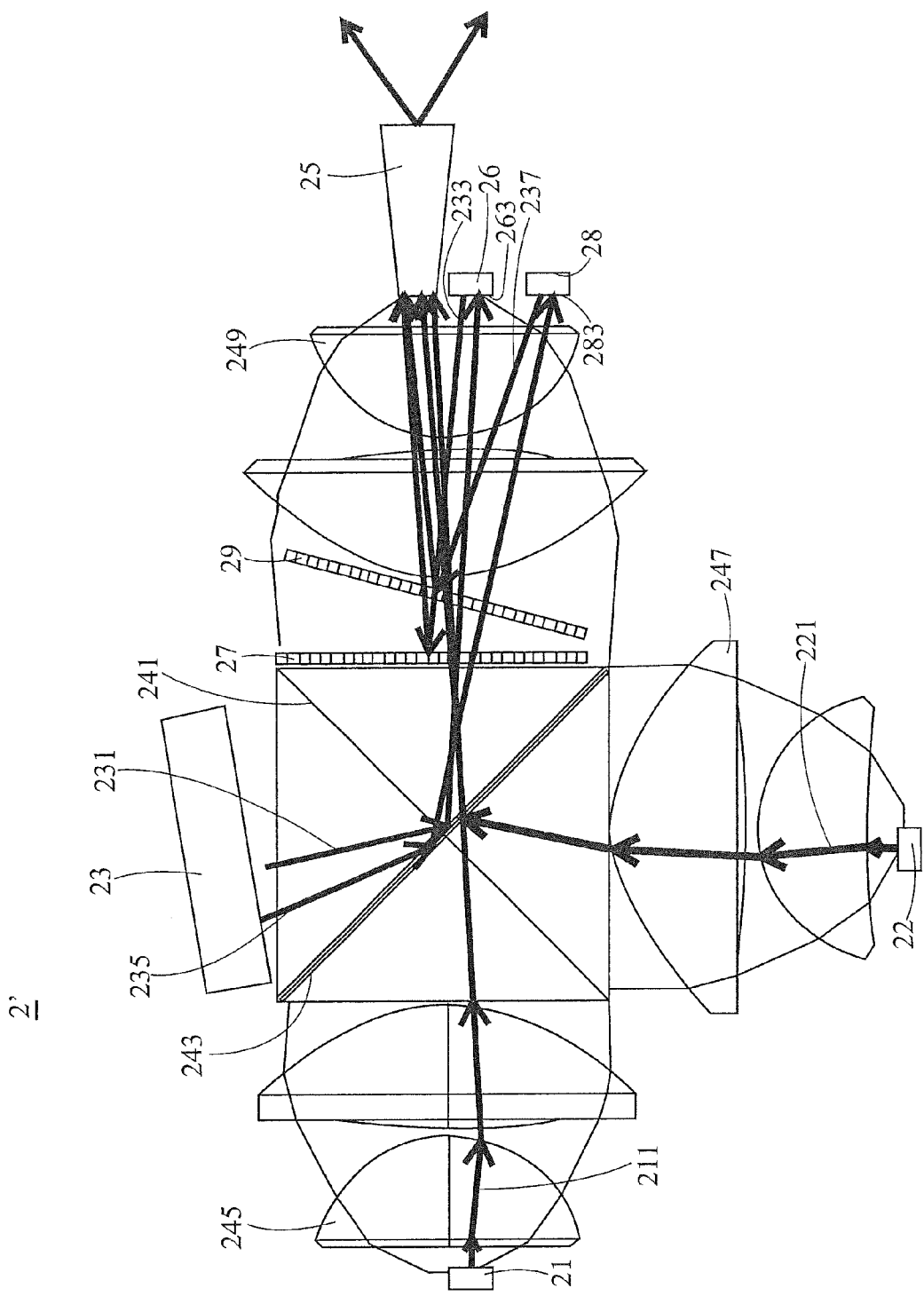
FIG. 6 is a schematic view of an illumination system according to the second embodiment of the present invention.
Figure 8:
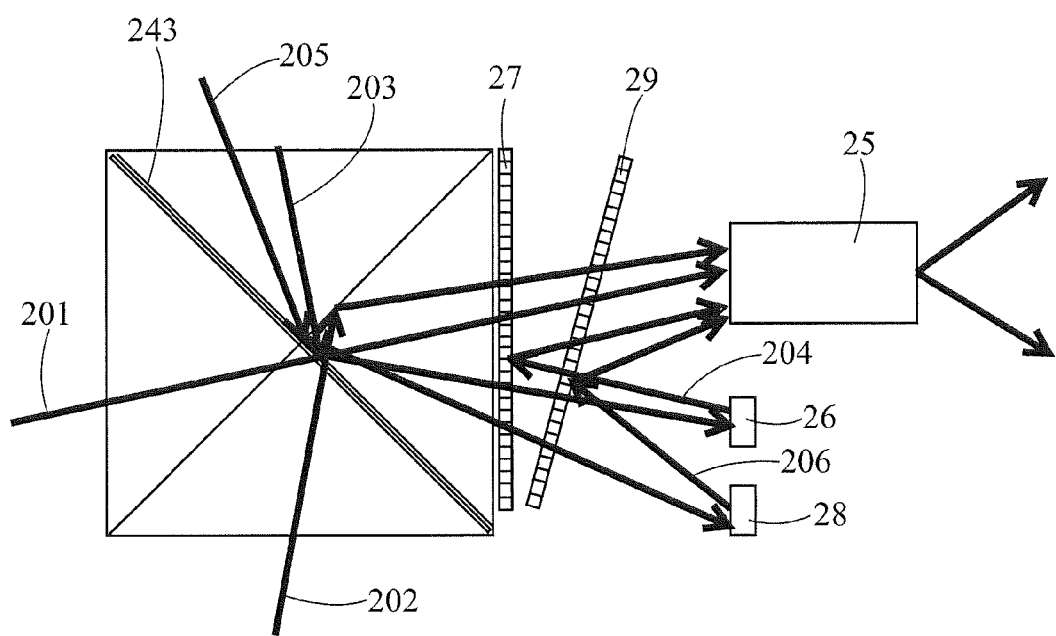
FIG. 8 is a schematic view illustrating the light paths of the illumination system according to the second embodiment of the present invention.

FIGS. 6 and 8 illustrate an illumination system according to the second embodiment of the present invention. The illumination system 2' of the second embodiment differs from the illumination system 2 of the first embodiment in that the illumination system 2' further comprises a second plate 28 and a second band-stop filter 29 while the third solid-state light source 23 is further adapted to provide a fifth-wavelength light beam 235. A fifth light path 205 of the fifth-wavelength light beam 235 is different from the third light path 203 of the third-wavelength light beam 231. The fifth-wavelength light beam 235 may also be a blue laser light beam.

Figure 7A:
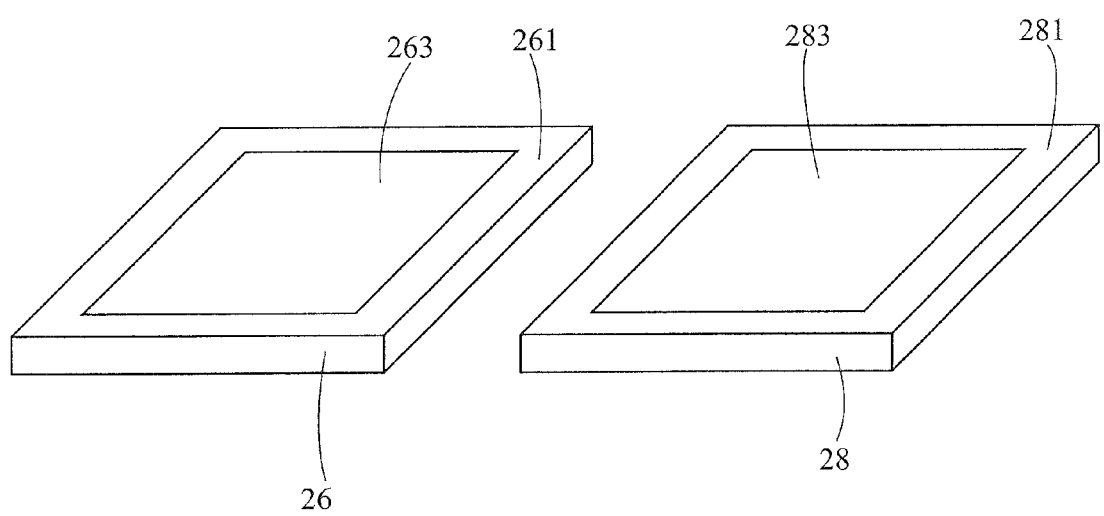
FIG. 7A is a schematic view illustrating an implementation of the first plate and second plate of the illumination system according to the second embodiment of the present invention.

The second plate 28 is disposed apart from the outputting surface of the light combining element 24. FIG. 7A illustrates a schematic view illustrating an implementation of the first plate 26 and the second plate 28 of the illumination system of the second embodiment. The second plate 28 has a second phosphor 283 and a second surface 281 opposite the outputting surface. The second phosphor 283 is disposed on the second surface 281.

Figure 7B:
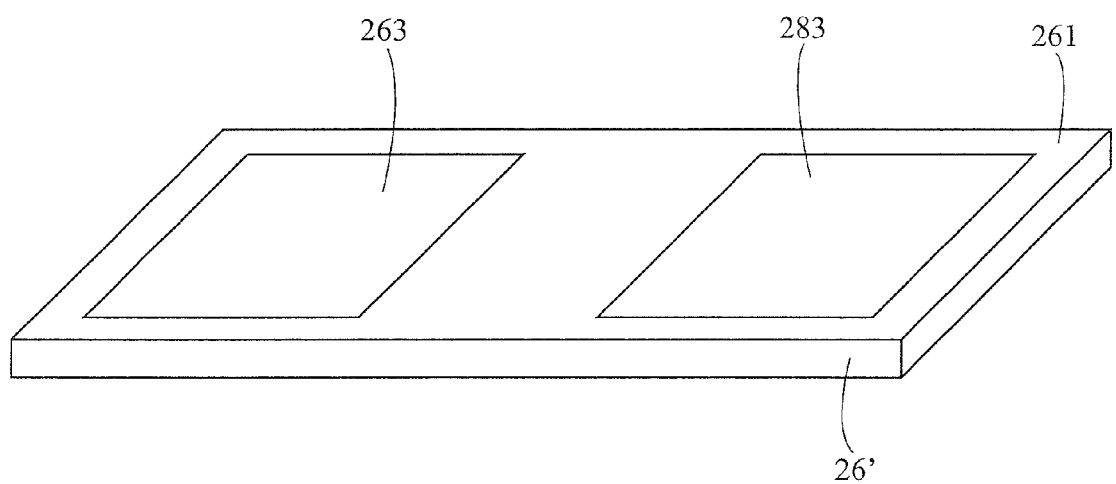
FIG. 7B is a schematic view illustrating another implementation of the first plate and the second plate of the illumination system according to the second embodiment of the present invention.

FIG. 7B illustrates a schematic view of a different implementation of the first plate 26 and the second plate 28 of the illumination system according to the second embodiment of the present invention. The first plate 26 and the second plate 28 may be combined into a plate 26' with a relatively large area, and the first phosphor 263 and the second phosphor 283 are disposed on a surface 261' of the plate 26' respectively.

With reference back to FIG. 6 and FIG. 8, the third-wavelength light beam 231 can excite the first phosphor 263 located on the first plate 26 to generate the fourth-wavelength light beam 233; and the fifth-wavelength light beam 235 can excite the second phosphor 283 located on the second plate 28 to generate a sixth-wavelength light beam 237.

In the second embodiment, the second phosphor 283 may be a red phosphor, which would indicate that the sixth-wavelength light beam 237 is a red light beam. Furthermore, the second-wavelength light beam 221 and the sixth-wavelength light beam 237 are red light beams of different wavebands, and the waveband of the second-wavelength light beam 221 is contained within the waveband of the sixth-wavelength light beam 237.

The second band-stop filter 29 is disposed between the outputting surface and the light homogenizing element 25. In this case, the first band-stop filter 27 may be disposed on the outputting surface, the second band-stop filter 29 may be disposed in front of the first band-stop filter 27, and an included angle is formed between the second band-stop filter 29 and the first band-stop filter 27. The second band-stop filter 29 is adapted to allow the first-wavelength light beam 211 to the fifth-wavelength light beam 235 to pass therethrough and reflect the sixth-wavelength light beam 237.

Next, the light paths of the light beams in the illumination system 2' will be further described. The first light path 201 to the fourth light path 204 are just the same as the light paths of the light combining element 24 in the first embodiment, and thus, will not be further described herein. The fifth-wavelength light beam 235 (the blue laser light beam) from the third solid-state light source 23 propagates into the light combining element 24 along the fifth light path 205, and is then reflected by the gap layer 243 out of the light combining element 24 along the fifth light path 205.

Then, the fifth-wavelength light beam 235 projected out of the light combining element 24 propagates to the second phosphor 283 on the second plate 28 to generate the sixth-wavelength light beam 237 (the red light beam). The sixth-wavelength light beam 237 then advances to the second band-stop filter 29 along the sixth light path 206.

After the sixth-wavelength light beam 237 reaches the second band-stop filter 29, some light rays (i.e., light rays with the same waveband as the second-wavelength light beam 221) of the sixth-wavelength light beam 237 pass through the second band-stop filter 29 while the other light rays (i.e., the light rays having different wavebands from the second-wavelength light beam 221) are reflected by the second band-stop filter 29 into the light homogenizing element 25.

It shall be appreciated that the included angle between the first band-stop filter 27 and the second band-stop filter 29 must be set in coordination with the first plate 26, the second plate 28 and the light homogenizing element 25 so that the fourth-wavelength light beam 233 and the sixth-wavelength light beam 237 can be reflected by the first band-stop filter 27 and the second band-stop filter 29 into the light homogenizing element 25.

Because the sixth-wavelength light beam 237 (the red light beam) is generated by the second phosphor 283, the sixth-wavelength light beam 237 has an adequate intensity and can be mixed with the second-wavelength light beam 221 (the other red light beam) to enhance the intensity of the red light beam outputted by the light homogenizing element 25.

According to the above descriptions, the illumination system of the present invention can reduce the space occupied by the illumination system and reduce the number of solid-state light sources to avoid the occupation of a large space as with conventional illumination systems. Furthermore, the illumination system of the present invention can not only reduce the space occupied but also enhance the intensity of a light beam of a specific color (e.g., a green light beam or a red light beam).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system, comprising:
   a first solid-state light source for providing a first-wavelength light beam;
   a second solid-state light source for providing a second-wavelength light beam;
   a third solid-state light source for providing a third-wavelength light beam;
   a light combining element, having three inputting surfaces, an outputting surface, a second-wavelength-light-beam reflecting surface and a gap layer, wherein the second-wavelength-light-beam reflecting surface and the gap layer intersect with each other, the second-wavelength-light-beam reflecting surface and the gap layer are located between the three inputting surfaces and the outputting surface, the second-wavelength-light-beam reflecting surface is used to allow the first-wavelength light beam and the third-wavelength light beam to pass therethrough and reflect the second-wavelength light beam, and the first, the second and the third solid-state light sources are disposed in front of the three inputting surfaces respectively;
   a light homogenizing element, being disposed apart from the outputting surface;
   a first plate, being disposed apart from the outputting surface, and having a first phosphor and a first surface opposite the outputting surface, wherein the first phosphor is disposed on the first surface to be excited by the third-wavelength light beam to produce a fourth-wavelength light beam; and
   a first band-stop filter, being disposed between the outputting surface and the light homogenizing element, and being used to allow the first-wavelength light beam to the third-wavelength light beam to pass therethrough and reflect the fourth-wavelength light beam.

2. The illumination system as claimed in claim 1, wherein the third solid-state light source is further used to provide a fifth-wavelength light beam which travels along a light path different from that of the third-wavelength light beam.

3. The illumination system as claimed in claim 2, further comprising a second plate and a second band-stop filter, wherein the second plate is disposed apart from the outputting surface and has a second phosphor and a second surface opposite the outputting surface, and the second phosphor is disposed on the second surface to be excited by the fifth-wavelength light beam to produce a sixth-wavelength light beam;
   the second band-stop filter is disposed between the outputting surface and the light homogenizing element and forms an included angle with the first band-stop filter, and the second band-stop filter is used to allow the first-wavelength light beam to the fifth-wavelength light beam to pass therethrough and reflect the sixth-wavelength light beam.

4. The illumination system as claimed in claim 3, wherein the second phosphor is a red phosphor.

5. The illumination system as claimed in claim 4, wherein the second-wavelength light beam and the sixth-wavelength light beam are red light beams of different wavebands.

6. The illumination system as claimed in claim 3, wherein the first band-stop filter is disposed on the outputting surface, and the second band-stop filter is disposed apart from the first band-stop filter.

7. The illumination system as claimed in claim 1, wherein the gap layer is an air layer.

8. The illumination system as claimed in claim 1, wherein the light combining element is an X-cube.

9. The illumination system as claimed in claim 1, further comprising a first lens set, a second lens set and a third lens set, wherein the first lens set is disposed between the first solid-state light source and the light combining element, the second lens set is disposed between the second solid-state light source and the light combining element, and the third lens set is disposed between the light homogenizing element and the first band-stop filter.

10. The illumination system as claimed in claim 1, wherein each of the first and the second solid-state light sources is an LED light source, and the third solid-state light source is a laser light source.

11. The illumination system as claimed in claim 10, wherein the first-wavelength light beam is a blue light beam, the second-wavelength light beam is a red light beam, and the third-wavelength light beam is a blue laser light beam.

12. The illumination system as claimed in claim 1, wherein the first phosphor is a green phosphor, and the fourth-wavelength light beam is a green light beam.

* * * * *